(12) United States Patent
Wynne et al.

(10) Patent No.: US 7,115,685 B2
(45) Date of Patent: Oct. 3, 2006

(54) FLUOROPOLYMER-CARBON DIOXIDE COMPOSITIONS AND METHODS OF PROCESSING FLUOROPOLYMERS

(75) Inventors: Kenneth Wynne, Midlothian, VA (US); Younosuke Ohsaka, deceased, late of Minoh (JP); by Takako Ohsaka, legal representative, Minoh (JP); Suresh Shenoy, Richmond, VA (US); Sadashige Irie, Setsu (JP)

(73) Assignees: Daikin Institute of Advanced Chemistry and Technology (DAI-ACT), Orangeburg, NY (US); Virginia Commonwealth University, Richmond, VA (US)

( * ) Notice: Subject to any disclaimer, the term of this patent is extended or adjusted under 35 U.S.C. 154(b) by 0 days.

(21) Appl. No.: 11/085,154

(22) Filed: Mar. 22, 2005

(65) Prior Publication Data

US 2005/0179170 A1    Aug. 18, 2005

Related U.S. Application Data

(63) Continuation of application No. 10/268,931, filed on Oct. 11, 2002, now Pat. No. 6,960,633.

(60) Provisional application No. 60/330,560, filed on Oct. 25, 2001.

(51) Int. Cl.
*C08F 114/24*    (2006.01)

(52) U.S. Cl. ................... 525/326.2; 525/331.4; 525/330.7; 525/383

(58) Field of Classification Search ............. 264/405, 264/464, 472, 486; 525/326.2, 331.4, 330.7, 525/383
See application file for complete search history.

(56) References Cited

U.S. PATENT DOCUMENTS 5,821,273 A * 10/1998 Venkataraman et al. ...... 521/79
5,912,278 A    6/1999 Venkataraman et al.

OTHER PUBLICATIONS

International Standard ISO12086-1, First Edition, 1995, p. 1.*

* cited by examiner

*Primary Examiner*—Roberto Rabago
(74) *Attorney, Agent, or Firm*—Whitham, Curtis, Christofferson & Cook, PC

(57) ABSTRACT

Fluoropolymer materials containing tetrafluoroethylene monomers, such as PTFE, are significantly swollen by supercritical carbon dioxide at high temperatures and pressures. The swollen fluoropolymer is processable by molding, extrusion, and other techniques. In addition, the fluoropolymer may be sintered at significantly lower temperatures compared to a nonswollen fluoropolymer material. The melting temperature of fluorinated polymers containing tetrafluoroethylene and triflouroethylene monomers which are swollen with supercritical carbon dioxide is significantly reduced, thereby permitting manufacturing operations such as extruding and molding to be performed at lower temperatures and with reduced risk of decomposition.

1 Claim, 9 Drawing Sheets

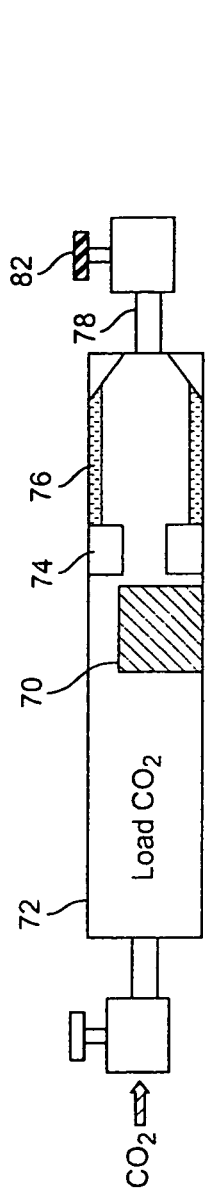
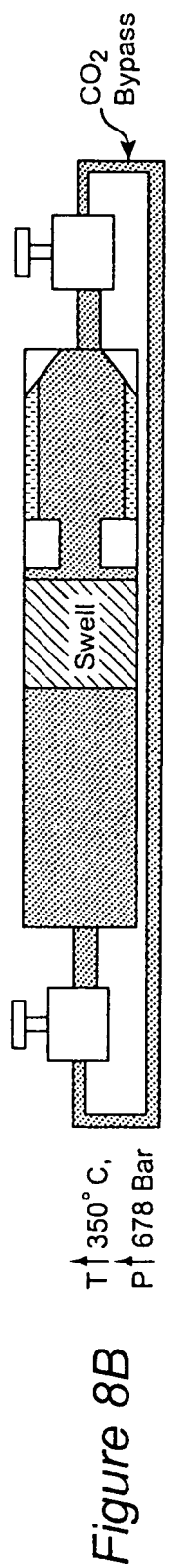
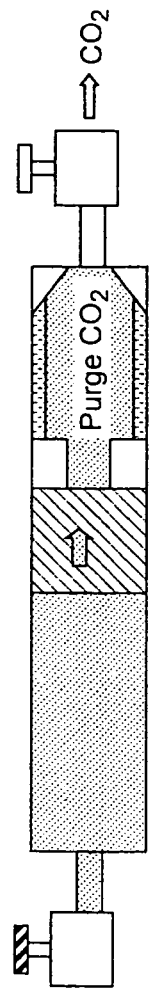
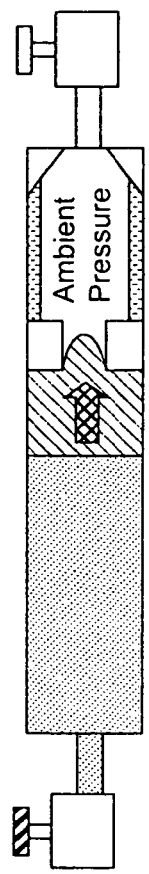
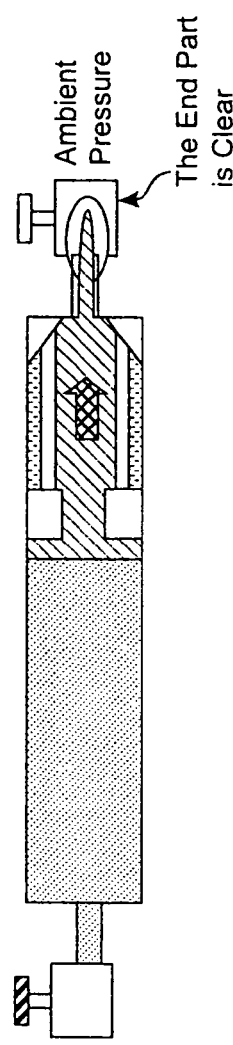
Figure 8A
Figure 8B
Figure 8C
Figure 8D
Figure 8E

FLUOROPOLYMER-CARBON DIOXIDE COMPOSITIONS AND METHODS OF PROCESSING FLUOROPOLYMERS

This is a continuation of application U.S. patent application Ser. No. 10/268,931 filed Oct. 11, 2002, now U.S. Pat. No. 6,960,633 which claims benefit of U.S. Provisional Pat. App. No. 60/330,560 filed Oct. 25, 2001.

BACKGROUND OF THE INVENTION

1. Field of the Invention

The invention generally relates to fluoropolymers, and more particularly to methods of processing fluoropolymers which permit molding and extruding of materials which are not ordinarily moldable or extrudable, and to permit sintering fluoropolymers at lower temperatures. The invention has particular utility for processing polytetrafluoroethylene (PTFE).

2. Background of the Invention

Polymer technology has employed supercritical carbon dioxide as an alternative fluid medium to replace harmful organic solvents. The use of supercritical carbon dioxide in the synthesis of polymers is discussed in Cooper, A. I., *J. Mater. Chem.* 10:207 (2000); Ajzenberg et al., *Chem. Eng. Technol.* 23(10), 829 (2000), and U.S. Pat. Nos. 5,496,901 and 5,618,894 (both of which are herein incorporated by reference). These references describe solubilizing monomers, including fluoromonomers, in carbon dioxide, and then polymerizing the solubilized monomers to form polymers of interest. Supercritical carbon dioxide has also been used to extract low molecular weight components from polymer matrices as discussed in McHugh et al. *Supercritical Fluid Extraction*, Butterworth-Heimann, 1994. In addition, supercritical carbon dioxide has been used as a blowing agent for the production of polymer foams as discussed in Utracki et al. *J. Polym. Sci. Part B-Polymer Physics* 39(3), 342 (2001) and Cooper, ibid. Furthermore, supercritical carbon dioxide is used for polymer processing. See, Kwag et al., *Ind. Eng. Chem. Res.* 40(14), 3048 (2001) and Royer et al., *J Polym. Sci: Polym. Physics* 38(23), 3168 (2000). Coating applications require dissolution or suspension of polymer in solvent. Supercritical carbon dioxide has been used as a solubilizing and suspending media because of its benign nature and solvent characteristics as a function of temperature and pressure in the supercritical state. See, for example, U.S. Pat. Nos. 5,696,195, 6,034,170, and 6,248,823, all of which are herein incorporated by reference. There is a high affinity of amorphous fluoropolymers for supercritical carbon dioxide (see, Kazarian, *J. Amer. Chem. Soc.* 118(7), 1729 (1996). This may be due to interactions between carbon dioxide molecules in the supercritical phase and C=O and C—F bonds in the fluoropolymer. Semicrystalline fluoropolymers are usually only slightly swollen by supercritical carbon dioxide or dissolved at very high temperatures and pressures.

Fluoropolymers have superior chemical and solvent resistance characteristics, and excellent thermal stability. Because of these properties, fluoropolymers have been increasingly used in the chemical and semiconductor industry. However, processing of certain fluoropolymers, particularly PTFE and "modified" PTFE, can be difficult. For example, PTFE is not moldable or extrudable. Rather, PTFE components are typically cut or shaved from billets of material.

PTFE is often processed by techniques that resemble those for ceramics. PTFE is sintered at 370° C. before being formed by processes such as ram extrusion (see Scheirs, *Modern Fluoropolymers*, John Wiley & Sons, New York, 1997). Recently, fluoropolymer thermolysis (burning) and sintering has been identified as a potential source of halogenated organic acids in the environment (see Ellis et al., *Nature* 412:321–324 (2001)). These halo-acids, such as trifluoroacetic acid are persistent in the environment, as they have no known degradation process (see Boutonnet et al., *Human and Ecological Risk Assessment* 5:59–124 (1999)). Of more concern was the identification of long chain perfluorinated acids that accumulate in fatty tissue as carcinogens (see Upham, *Int. J. Cancer* 78:491–495 (1998)). In addition, chlorofluorocarbons (CFCs) were identified in the oxidation products of chlorofluoropolymers. These may migrate to the stratosphere and have a negative effect on the ozone layer. See Ritzvi, *J. Thermal Analysis* 45:1597–1604 (1995).

For some applications of fluoropolymers it is unnecessary and even undesirable to dissolve the polymer. Rather, it may be desired simply to swell or plasticize the fluoropolymer in order to change solid-state transition temperatures (melting and glass transition temperature), or solid-state structure. However, until this invention, very limited swelling of semicrystalline fluoropolymers with supercritical carbon dioxide has been observed. For example, Briscoe et al., *J. Polym. Sci: Polym. Physics* 29(989) (1991), reported that stiffer polymers like PTFE are difficult to expand and hence sorb less gas, and that the extend of carbon dioxide induced linear dilation is limited (approximately 0.2% at 42° C. and 3500 psi). Briscoe et al., *J Polym. Sci: Polym. Physics* 36(2435) (1998) reported that the maximum dilation for polyvinylidene fluoride at 4400 psi is 1.2% at 80° C. and 0.85% at 42° C. Aurora et al., *Macromolecules* 32:2562–2568 (1999) and Kung et al., *Macromolecules* 33:8192–8199 (2000) discuss the manufacture of polymer blends (e.g., PTFE-co-hexafluoropropylene (FEP)/polystyrene) by infusing a carbon dioxide solution carrying monomers into the FEP. Aurora et al. report 4.4% carbon dioxide incorporation for swelling of FEP at 80° C. and 3530 PSI.

After synthesis, PTFE and modified PTFE are sintered prior to other processing. The manufacture of polymer products by sintering of polymers in the powder form is well known. This technology is employed for processing of polymers where conventional techniques such as extrusion, injection molding, etc., are either non-economical or difficult to utilize due to the extremely high viscosities of the polymer melt. For example, see Ebnesajjd, S. *Non-Melt Processable Fluoroplastics: The Definitive User's Guide and Databook*, PDL Handbook series, Norwich, N.Y., 2000 and U.S. Pat. No. 4,064,077 which is herein incorporated by reference.

Generally, there are two types of sintering processes:

In the first process, the powder is compressed or compacted by subjecting it to high static pressure. Then sintering of the compressed preform is effected by means of thermal treatment at temperatures greater than the melting point or softening point of the polymer.

The latter treatment brings about the coalescence of individual polymer particles and reduces or eliminates voids. This is called "free sintering" since sintering is carried out without the application of pressure (Ebnesajjd, ibid.)

In the second process, the powder is compressed or compacted by subjecting it to high static pressure. After only partial pressure release, the preform is heated to the sintering temperature. A post-thermal treatment is then provided to eliminate internal stresses. This is called "pressure sintering" (Ebnesajjd, ibid., and U.S. Pat. No. 6,066,280 which is herein incorporated by reference).

In spite of the popularity of these processing techniques for polymers such as PTFE, UHWMPE, etc., these processes have significant drawbacks and special care must be taken to obtain a homogeneous product with good mechanical properties such as tensile strength. Convention sintering and pressure sintering have the following disadvantages:

a) Polymers are generally good thermal insulators (e.g., the thermal conductivity of PTFE is approximately 0.25 W/m°K). This impacts the rate of sintering of the preform. Traditionally, the preform is heated by circulating large quantities of hot air. The design of the oven is thus critical to prevent the formation of hot spots in the preform.

b) Though the economics of the sintering process favors high heating rates, the low thermal conductivity of the preform can result in the formation of thermal gradients between the outside and insider of the preform leading to cracks in the preform. The size of the preform thus dictates the maximum permitted heating rates which may be quite low.

c) As for the heating process, controlled cooling of the sintered product is critical to obtain a homogenous crack-free product. In general, hold periods are introduced during the heating and cooling cycle to allow the heating or cooling of the interior section of the preform, thereby reducing the thermal gradient, and hence the possibility of crack formation. This results in much longer times for the sintering process which translates into increased manufacturing costs.

d) The temperature of sintering is usually 20–30° C. above the melting point of the polymer. For example, in the case of PTFE, the sintering temperature ranges from 360° C. to 380° C. (Ebnesajjad, ibid.). At this temperature, the adjacent melted PTFE particles fuse together and coalesce, thereby reducing voids. However, due to extremely high melt viscosity (e.g., approximately $10^{11}$ to $10^{12}$ poise for PTFE) molecular mobility is severely inhibited. To compensate for this reduced mobility, long sintering times are required depending on the size of the product. However, maintaining the polymer above its melting temperature for long periods of time can result in degradation that leads to product contamination or diminution in properties. This is a problem particularly for demanding applications such as microelectronics fabrication operations. Furthermore, the decomposition products may be environmentally harmful as noted above (see Ellis et al., *Nature* 412:321–324 (2001)).

SUMMARY OF THE INVENTION

It is an object of the invention to provide a swollen PTFE or fluoropolymer material containing tetrafluoroethylene monomers which includes at least 10% supercritical carbon dioxide, and in some applications a swollen PTFE or fluoropolymer material containing tetrafluoroethylene monomers which includes at least 25% supercritical carbon dioxide or at least 40% supercritical carbon dioxide, and methods for producing the same.

It is an object of the invention to provide an improved method for processing PTFE or fluoropolymer materials containing tetrafluoroethylene monomers which involves swelling the PTFE or fluoropolymer material with supercritical carbon dioxide, and then processing the swollen material by extrusion, molding or sintering.

It is yet another object of the invention to provide an improved method for incorporating materials, fillers or additives into PTFE or fluoropolymer materials containing tetrafluoroethylene monomers which involves swelling the PTFE or fluoropolymer material with supercritical carbon dioxide laden with the materials, fillers or additives.

According to the invention, supercritical carbon dioxide is incorporated into PTFE or fluoropolymer materials containing tetrafluoroethylene monomers at high temperatures, e.g., at least 200° C., and most preferably at least 300° C., under pressure, e.g., preferably at least 2,000 psi and more preferably at least 7,000 psi or at least 9,000 psi. The weight percent carbon dioxide in swollen PTFE or fluoropolymer materials is preferably 25 wt %, but is at least 10 wt % in certain applications, and at least 40 wt % in certain applications. The swollen material can be processed by molding, extrusion and low temperature sintering. In addition, fillers, additives, monomers which are later polymerized, etc., can be simultaneously incorporated into the PTFE or fluoropolymer material by incorporation into the supercritical carbon dioxide used to swell the PTFE or fluoropolymer material. Furthermore, the supercritical carbon dioxide treatment can be used for sintering fluoropolymers such as PTFE, which can reduce the processing temperature by as much as 40° C.–60° C. depending on the conditions employed. Given the higher diffusivity of supercritical carbon dioxide and the higher thermal conductivity at high pressure, the sintering time may be reduced significantly.

The invention in a preferred embodiment provides a method for processing polychlorotrifluoroethylene (PCTFE), comprising the steps of: exposing PCTFE to supercritical carbon dioxide under pressure; heating said PCTFE to a melting temperature below 200° C. (such as a melting temperature that ranges from 150° to 190° C.); and performing a manufacturing operation (such as molding or extruding) on said PCTFE above said melting temperature while said PCTFE is swollen by said supercritical carbon dioxide, such as a method wherein said heating and exposing steps are performed simultaneously.

BRIEF DESCRIPTION OF THE DRAWINGS

FIGS. 8a–8e are schematic drawings of an experimental extrusion apparatus.

DETAILED DESCRIPTION OF THE PREFERRED EMBODIMENTS OF THE INVENTION

Figure 1:
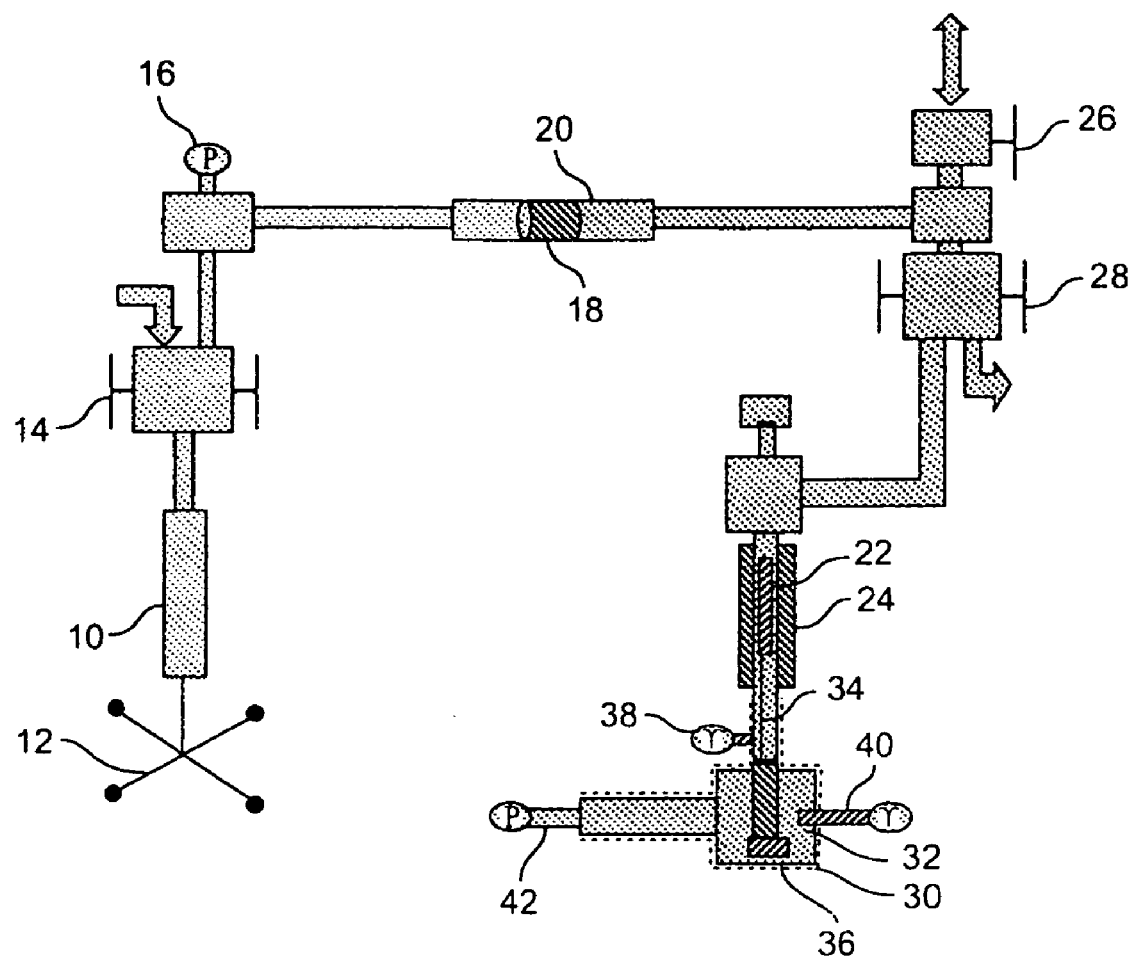
FIG. 1 is a schematic drawing showing an apparatus employed to measure swelling in supercritical carbon dioxide.

This invention has particular application to PTFE and related fluorinated polymer materials containing tetrafluoroethylene monomers. The molecular weight of the PTFE chemicals in the PTFE material may vary considerably based on the processing methodologies. For example, the molecular weight of these materials in the practice of the present invention may vary from less than 0.5 kd to more than 10,000 kd. Higher molecular weight PTFE materials have been widely used in packing applications; for producing gaskets, diaphragms and tubes or applications requiring mechanical strength; as insulators for electrical wiring; as coatings for fabrics and for industrial and household equipment; as abrasion resistant slide coatings; as sealing additives; as a filter medium; and as a masking materials. Lower molecular weight PTFE materials have been used as lubricants, extreme-pressure additives, and as release agents. It should also be understood that the invention may also be practiced with other fluorinated polymers which include tetrafluoroethylene or trifluoroethylene monomers. Typical fluorinated polymers within this family may include modified PTFE (e.g., as copolymer with perfluoropropyl vinyl ether (PFA-like), a graft or block copolymer of PTFE, or PTFE that has been functionalized to include non-fluoro moities), poychlorotrifluoroethylene (PCTFE), copolymers of tetrafluoroethylene and perfluoroalkyl vinyl ether (PFA), copolymers of tetrafluoroethylene and hexafluoropropylene (FEP), copolymers of tetrafluoroethlylene and ethylene (ETFE), copolymers of PTFE with perfluorobutyl vinyl ether (PBVE), copolymers of polyvinyldifluoride (PVDF) and tetrafluoroethylene (TFE), copolymers of PTFE with hexafluoropropylene (HFP), P(VDF-co-HFP-co-TFE), copolymers of TFE and 2,2-bistrifluoromethyl-4,5-difluoro-1,3-dioxide (PDD). As with PTFE, the molecular weight of these materials may vary widely within the practice of this invention, such as, for example, from less than 0.1 kd to more than 10,000 kd.

The invention involves the incorporation of high quantities of supercritical carbon dioxide into a fluorinated polymer which includes tetrafluoroethylene monomers, e.g., PTFE, PFA, FEP, ETFE, PCTFE etc. In particular, at high temperatures, e.g., temperatures in excess of 200° C., and preferably in excess of 300° C., and pressures, e.g., pressures in excess of 2,000 psi (138 bar), and preferably in excess of 7,000 psi (493 bar), a swollen fluorinated polymeric material can be produced which is preferably in excess of 10% by weight supercritical carbon dioxide (and, depending on processing conditions, in excess of 25% or 40% by weight of supercritical carbon dioxide). This level of swelling is significantly higher than has been observed previously in the above-mentioned references with semicrystalline fluorinated polymers. The swollen fluorinated polymeric material can be processed in ways which are not possible in its unswollen state or when only modest amounts of supercritical carbon dioxide are incorporated. For example, swollen PTFE can be molded (e.g., injection molded, compression molded, stamped, etc.) or extruded (e.g., passed through a die or extrusion orifice). In sharp contrast, non-swollen PTFE is not moldable or extrudable. In addition, swollen PTFE can be sintered at lower temperatures than those ordinarily required.

In addition to the commercial processing benefits, the supercritical carbon dioxide assisted processing offers the benefit of lower processing temperatures along with processing in the absence of oxygen. This benefit is expected to minimize or eliminate manufacturing as a point source of halogenated organic acids and other perfluorinated species that may be environmentally harmful.

FIG. 1 shows a schematic diagram of an apparatus used to measure the swelling of fluoropolymer samples in supercritical carbon dioxide. The apparatus includes a pressure generator 10 capable of generating up to 30,000 psi water pressure. Pressure control is achieved using a manual high pressure control 12, a 3-way valve 14 which permits water insertion, and a pressure gage 16 to monitor the pressure generated. A piston 18 with an O-ring separates the water pressure side from the carbon dioxide side 20 of the apparatus (note that nitrogen can be used in place of carbon dioxide in the apparatus; however, data shows that nitrogen results in negligible swelling of PTFE and related polymers). The apparatus uses a linear variable differential transformer (LDVT) coil configuration as described in Ender, *ChemTech* 16 (52) (1986) which includes an LVDT magnetic inner coil 22 and an LVDT outer coil 24. The fluid (e.g., carbon dioxide or nitrogen, but, for purposes of this description "carbon dioxide") enters through valve 26, which also permits purging to a vent hood (not shown). The carbon dioxide passes through a 3-way valve 28 and is directed to the LVDT coil configuration. The 3-way valve 28 can permit directing carbon dioxide to a second LVDT system (not shown). The LVDT configuration encircles a length of nonmagnetic steel pressure pipe which is connected to the sample chamber 30 which includes the plasticized sample 32. A thin, nonmagnetic threaded follower rod 34 is placed inside the steel pressure pipe. One end of the follower rod 34 rests on the polymer sample 32 while a cylindrical magnet (LVDT magnetic inner coil 22) is threaded onto the other end. The sample and carbon dioxide is then heated under pressure to form supercritical carbon dioxide. The change in dimensions of the polymer sample 32 in one direction is measured by the coil of the LVDT configuration which tracks motion of the magnetic core 22 attached to the follower rod inside pressure pipe. The system is calibrated to accurately measure the dimensional changes. The chamber 30 is surrounded by a heating tape 36 and connected to a thermocouple 38 for heating the sample 32. A thermistor 40 is used to assess sample temperature. A pressure transducer 42 is used to assess pressure on the sample 32. The sample chamber 30 may rest on a sample stand 44 which may be carbon graphite covered with aluminum foil. The advantage of this system is that the use of dynamic seals is avoided making it easier to operate at higher T and P.

Experiments were conducted to ascertain swelling results employing (I) constant temperature and variable pressure ranging from 2000 psi to 10000 psi and back to 2000 psi, and (II) constant pressure and variable temperature ranging from 80° C. to 320° C. depending upon the fluoropolymer.

Figure 2:
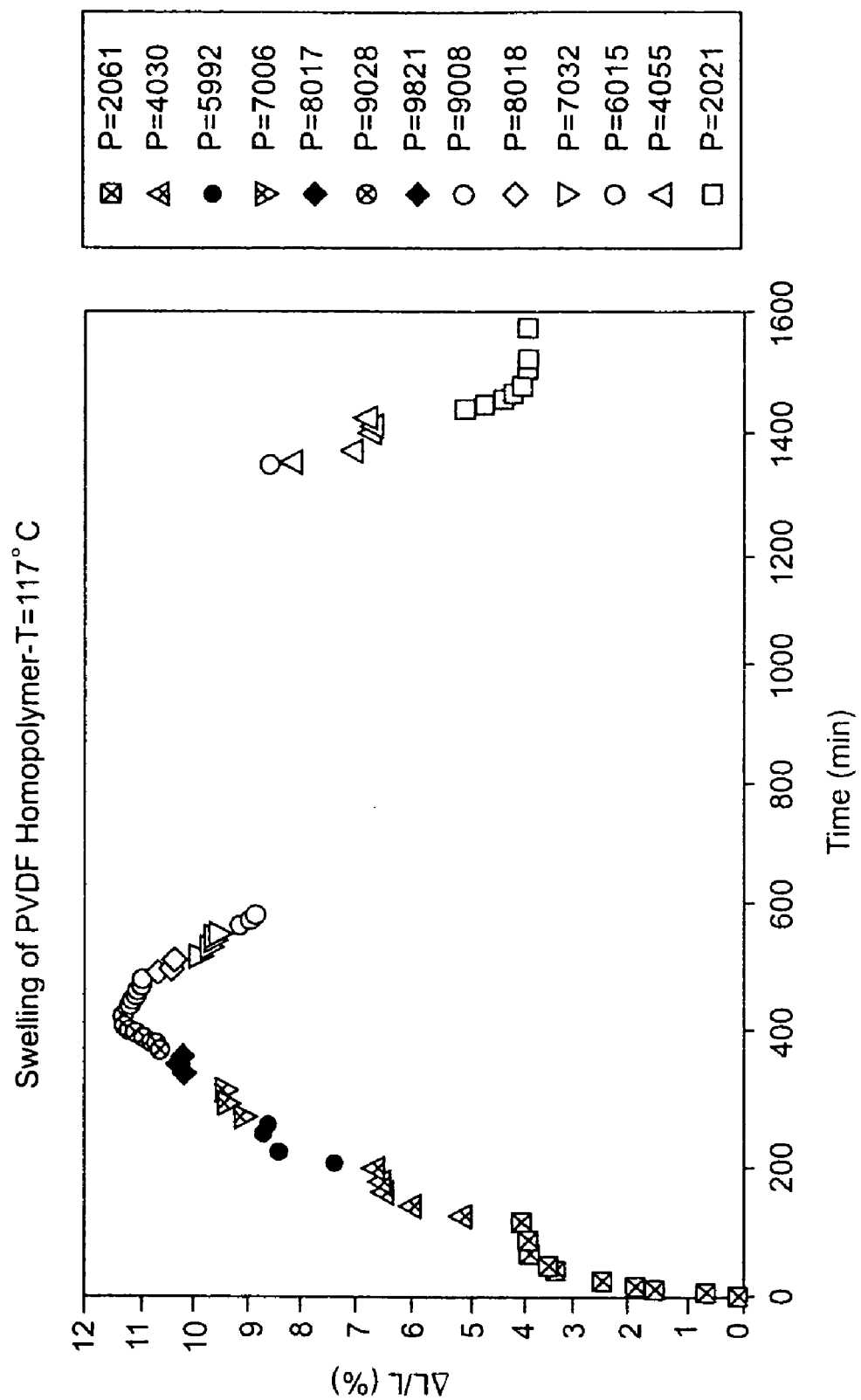
FIG. 2 is a graph showing swelling of PVDF at constant temperature (117° C.) and at different pressures.

FIG. 2 shows a plot of the percent change in the linear dimension ($\Delta L/L$ (%)) as a function of pressure for PVDF homopolymer at a constant temperature (117° C.). It is noted that increasing pressures result in increases in swelling by carbon dioxide.

Figure 3:
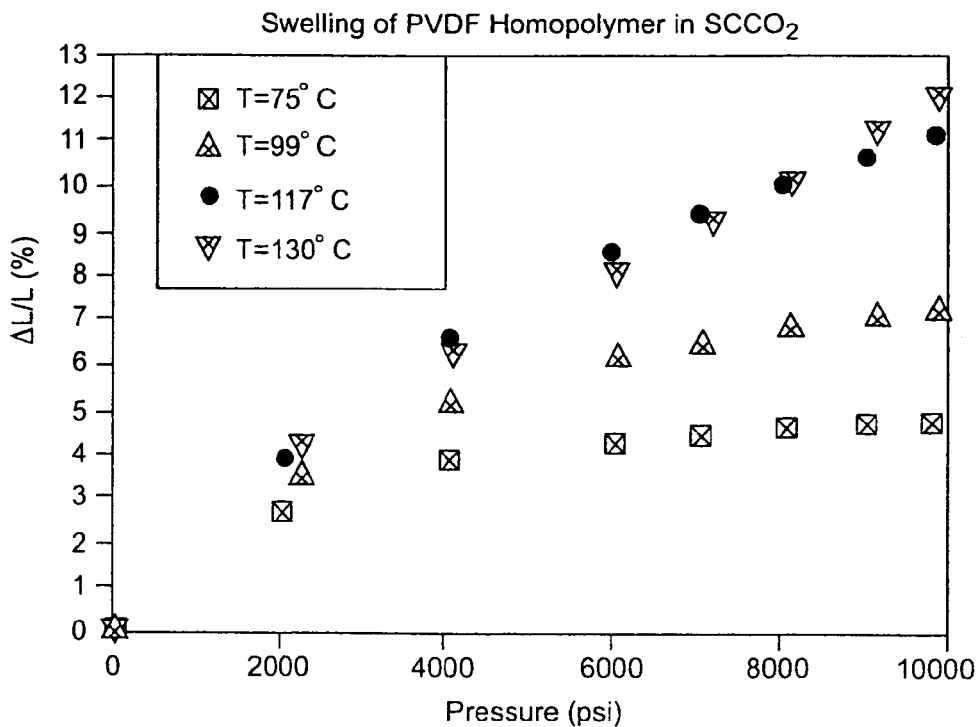
FIG. 3 is a graph presenting a compilation of PVDF swelling data at different temperature (T) and pressure (P).

FIG. 3 presents results from an isotropic swelling model from which the weight fraction of supercritical carbon dioxide in the polymer/supercritical carbon dioxide material (the swollen PVDF or fluoropolymer material) can be obtained. FIG. 3 shows that as temperatures and pressures increase, the weight percentage of carbon dioxide in the swollen PVDF increases. At 10000 psi and 130° C. the weight percentage of incorporated carbon dioxide is above 10%.

Figure 4:
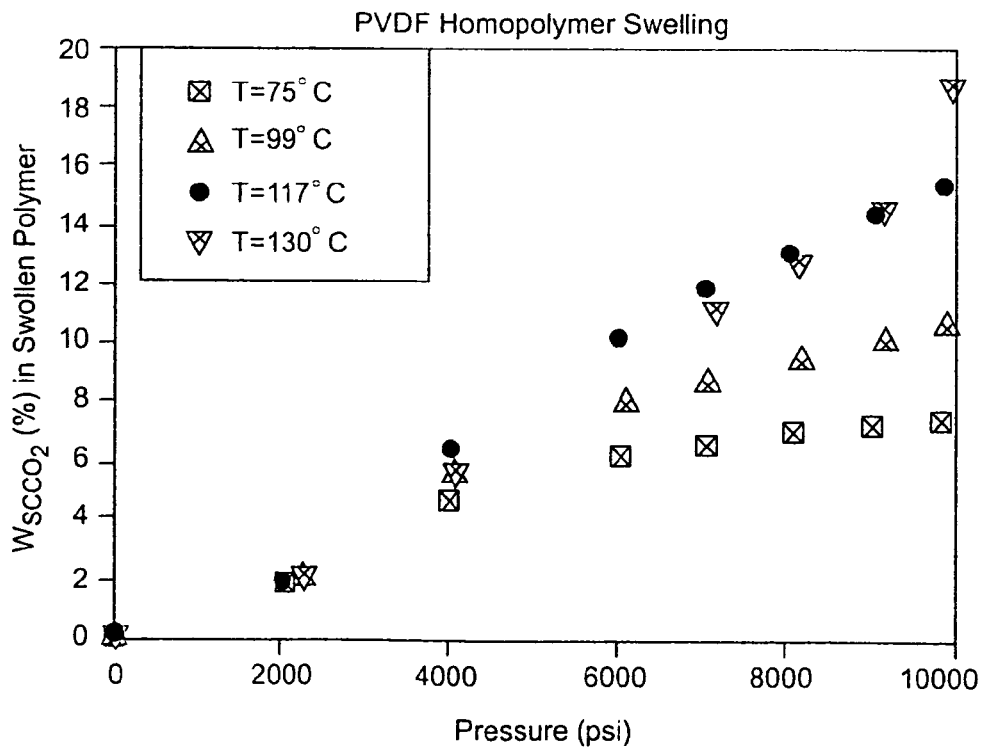
FIG. 4 is a graph presenting the composition by weight percentage of supercritical carbon dioxide in swollen PVDF.

FIG. 4 shows a plot of the weight fraction of supercritical carbon dioxide in the swollen PVDF material calculated using the linear swelling data. From this it can be deduced that the supercritical carbon dioxide weight fraction in the swollen PVDF/supercritical carbon dioxide system corresponds to a minimum of 2.7 wt % and a maximum of 12.5% corresponding the measured linear change of 1.9% and 18.8%, respectively.

The results in FIGS. 2–4 show higher incorporation of supercritical carbon dioxide in PVDF than has been reported previously (Briscoe 1998, 1.2% at 80° C.).

Figure 5:
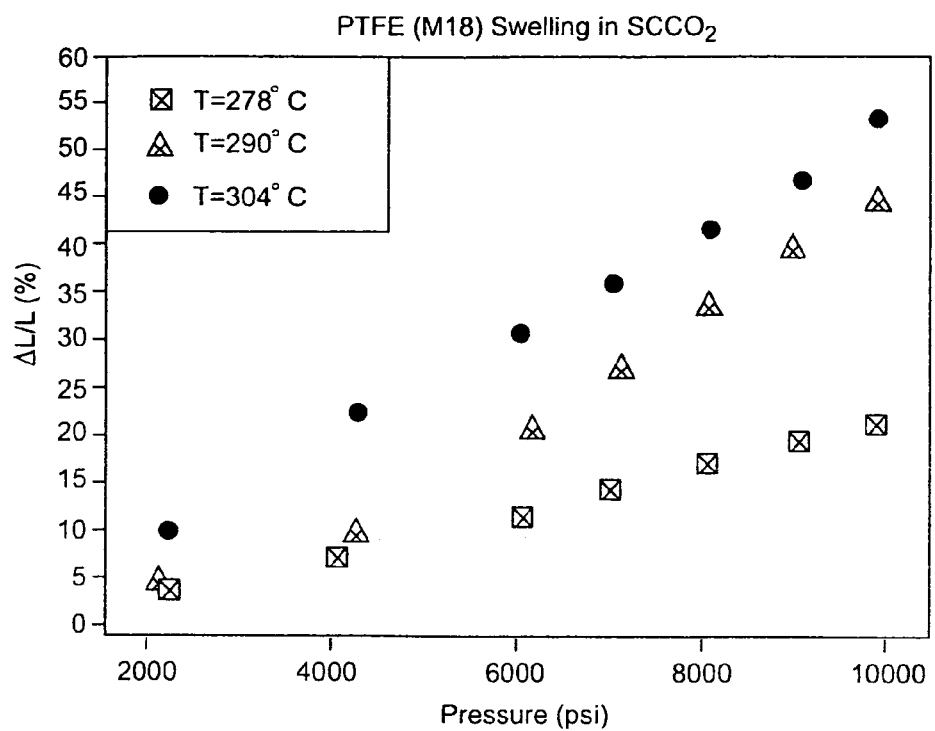
FIG. 5 is a graph showing data on the linear dilation of PTFE in supercritical carbon dioxide.
Figure 6:
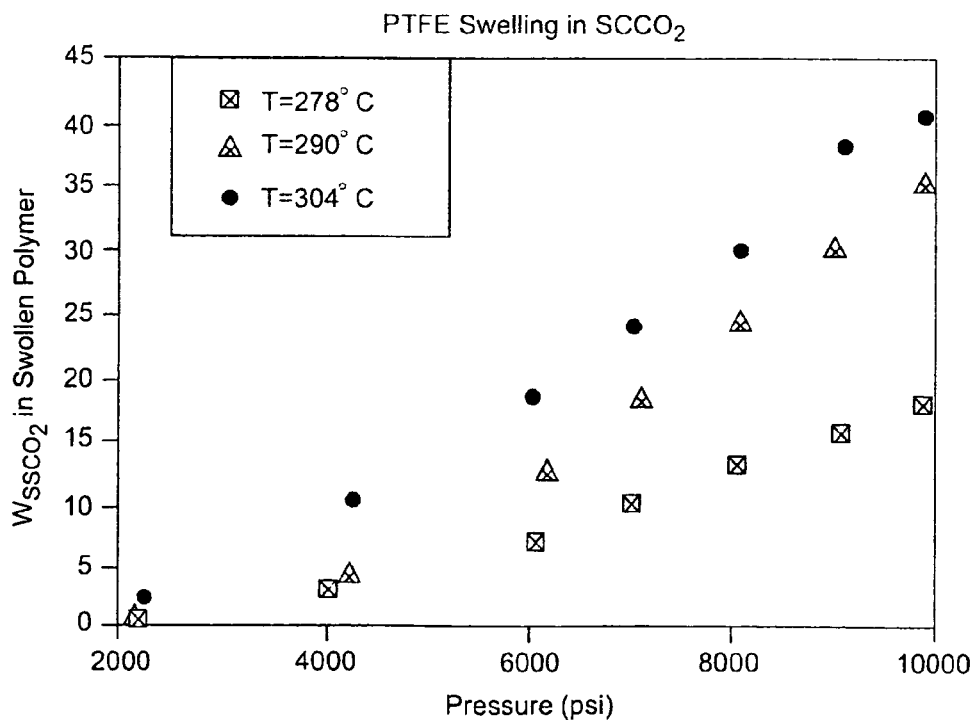
FIG. 6 is a graph presenting the composition by weight percentage of supercritical carbon dioxide in swollen PTFE.
Figure 7:
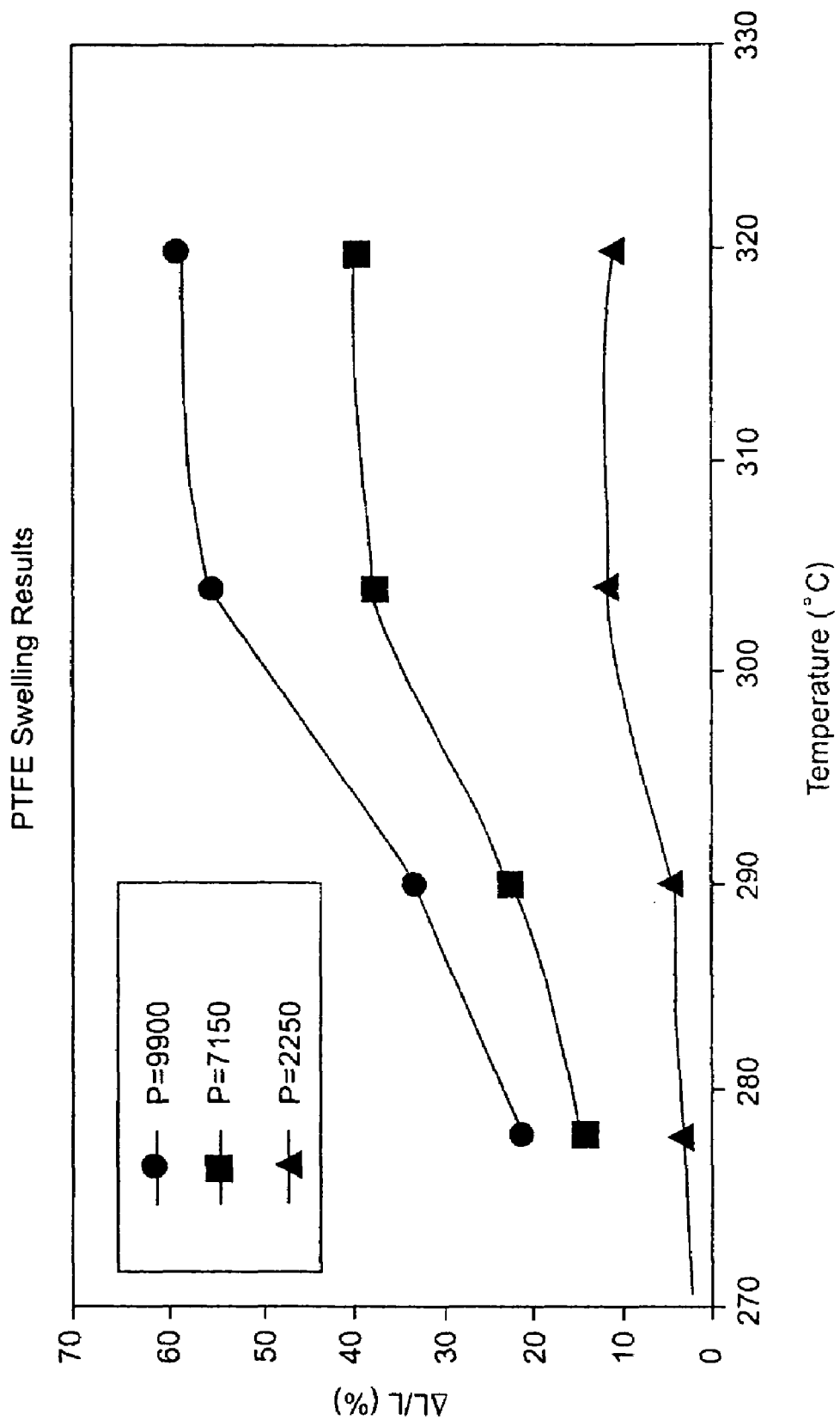
FIG. 7 is a graph showing the incorporation of supercritical carbon dioxide at different pressures over increasing temperature.

The results in FIGS. 5–7 present dramatically higher carbon dioxide incorporation results for PTFE. These results demonstrate that fluorinated polymer materials which contain tetrafluoroethylene monomers can be swollen with supercritical carbon dioxide to levels of at least 10 wt % carbon dioxide or higher (e.g., at least 25 wt % or at least 40 wt % carbon dioxide). The swollen PTFE or swollen fluorinated polymer containing tetrafluoroethylene monomers can be processed by molding and extruding. Heretofore, incorporation of carbon dioxide into these materials has not been realized at these levels. In addition, the ability to provide a processable swollen PTFE or fluorinated polymer containing tetrafluoroethylene monomers may allow for use of PTFE or the fluorinated polymer in significantly more applications, and should allow for reduced manufacturing costs. After processing of the swollen PTFE or fluorinated polymer, the carbon dioxide simply diffuses from the material over time. Thus, for example, a PTFE part can be shaped by molding or extrusion while in its swollen state, and then the carbon dioxide can be removed to yield a shaped PTFE article. In contrast, unswollen PTFE cannot be molded or extruded.

FIG. 5 shows a plot of the compiled linear swelling data for the swelling of PTFE samples in supercritical carbon dioxide at various temperatures and pressures. The observed linear dilations range from 4% and a maximum linear swelling of 53%.

FIG. 6 shows the results using an isotropic swelling model of the weight fraction of supercritical carbon dioxide in the swollen PTFE/supercritical carbon dioxide material calculated and plotted as a function of pressure. The linear dilations correspond to compositions of supercritical carbon dioxide of 0.89% to 41% by weight.

FIG. 7 shows the swelling results for PTFE at variable temperatures for different pressures.

It is clear from FIGS. 6 and 7 that at higher temperatures (e.g., temperatures of at least 200° C. and most preferably of at least 300° C.) and higher pressures (e.g., pressures of at least 2000 psi and most preferably of at least 7000 psi), PTFE can be swollen to include large quantities of carbon dioxide (e.g., preferably at least 10 wt % carbon dioxide and in some applications preferably at least 25 wt % or 40 wt % carbon dioxide).

An important advantage of the swollen PTFE compositions contemplated by this invention, as well as other swollen fluorinated polymers containing tetrafluoroethylene monomers, is that they can be processed by extrusion and molding. Unswollen PTFE cannot be processed by extrusion and molding. FIGS. 8a–e depict an experimental apparatus that was used to extrude PTFE. In FIG. 8a, a PTFE sample 70 (produced by the Daikin corporation and sold as Daikin M-18 resin) is positioned in a housing 72 (e.g., a steel pressure pipe) on one side of a die 74. Copper pipe 76 extends from the opposite side of the die 74 within the housing 72 and the die includes an orifice 78 at its end to extrude the PTFE. Valves 80 and 82 control the pressure of supercritical carbon dioxide on the sample 70 side and extruded side, respectively. FIG. 8b shows the initial temperature is 350° C. and the initial pressure is 678 bar, 10 ksi. At this point, the sample has swollen sufficiently so as to be "self-sealing". That is, passage of carbon dioxide from the left (in back of the sample 70) to the right (in front of the sample 70) is greatly restricted. The calculation of the space needed for self sealing was made on the basis of the swelling observed with the LVDT experiments reported in conjunction with FIG. 1, and was about 50%. Self sealing of the polymer allows the carbon dioxide on the right side of the apparatus to be purged with valve 82 FIG. 8c shows reduction in pressure on the right hand side of the apparatus. As shown in FIG. 8d, the reduction in pressure on the right side down to ambient pressure (1 bar, 15 psi) causes swollen PTFE to rapidly extrude through the die 72. FIG. 8e shows that as the PTFE is extruded from the left side to the right side of the apparatus due to the pressure differential, the pressure on the left side can increase due to the enlargement of volume on the left side of the swollen PTFE sample 70.

Parts which were extruded with the apparatus shown in FIG. 8 conformed to and molded the shape of the inside chamber. The end part, which was only about a millimeter in diameter conformed to the shape of the entrance of the valve at the end of the apparatus. The narrow part formed, which was about a millimeter in diameter, was almost transparent, while the remainder was the usual white color. Melting point experiments with the molded PTFE M-18 resin showed that it had substantially the same melting point as the "as received" material; however, it did have a slightly higher melting point and enthalpy which is perhaps due to the confinement and orientation effects. Similar molding experiments were successful under milder temperature and pressure conditions (e.g., 330° C. and a differential pressure of preferably 2 ksi (e.g., 10 ksi on sample side and 8 ksi on molding side)).

In addition to the molding and extrusion processing benefit conferred by the supercritical carbon dioxide swelling of PTFE or other fluorinated polymers, fillers, low molecular weight components and additives (e.g., dyes, medicaments, bactericidal compounds, etc.) could be added to and incorporated in the swollen material by combining with the supercritical carbon dioxide. These materials would be incorporated with the supercritical carbon dioxide into the swollen fluoropolymer, and would remain there after the carbon dioxide is permitted to vaporize out. Composite polymers might also be made by incorporating monomers into the supercritical carbon dioxide, then having the monomer laden supercritical carbon dioxide incorporated to the fluoropolymer, and then allowing the monomers to polymerize. Furthermore, as discussed in more detail below, the process allows for sintering of the fluoropolymer at lower temperatures.

The present invention also has particular advantages in both "free sintering" and "pressure sintering" processes. In this aspect of the invention, supercritical fluids (which are preferably supercritical carbon dioxide, but may also include nitrogen, supercritical sulfur hexafluoride, etc.) are used to plasticize and swell the polymer particles during the sintering process. The interactions between the supercritical fluids and the polymer particles results in reducing $T_m$ of the semicrystalline polymers. This effect is similar to that demonstrated for solutions of polymers in organic solvents or the softening temperature for amorphous polymers (see, Flory P.

J., "*Principles of Polymer Chemistry*", Cornell University Press, 1953), but, unlike conventional organic solvents, supercritical fluids, particularly supercritical carbon dioxide, are highly compressible and the density can be tuned as a function of temperature and pressure. In fact, densities close to that exhibited by the organic solvents can be achieved for supercritical carbon dioxide (see Kirby et al., *Chem. Rev.* 99(2), 565, (1999)) and Cooper, *J Mater. Chem.* 10, 207, 2000). Another significant advantage of using these fluids is their inherently high diffusivity and low viscosity. Furthermore, supercritical carbon dioxide does not impact the environment in the same manner as the generally harmful organic solvents. As discussed in more detail above, supercritical carbon dioxide has been actively promoted in polymer technology as an alternative fluid media to replace organic solvents and are often employed in polymer synthesis, for the extraction of low molecular weight components, as blowing agents in the production of foams, and in the area of polymer processing as processing aids.

In the practice of the sintering aspect of this invention, the supercritical carbon dioxide can be mixed with cosolvents in order to improve the plasticization of the polymers to be processed by sintering. The advantage of this approach is the exploitation of the solubility of the supercritical fluid in the polymer, compared to prior work which has focused on the solubility of the polymer in the supercritical fluid. The cosolvent or entrainer need not be a supercritical fluid. This invention improves the conventional sintering processes significantly by reducing the temperature of sintering, thereby reducing the possibility of degradation. The present invention may decrease melt viscosity and improve heat transfer, thus decreasing sintering times required for the entire sintering process. The present invention should enable the production of better products at faster rates, hence making the manufacturing process more cost effective.

As polymerized (unsintered) PTFE has a unique crystalline morphology and exhibits a melting temperature of approximately 345° C. to 350° C. Due to extremely high melt viscosity, free sintering is commonly employed in the manufacture of PTFE products. On sintering, products of good mechanical properties are obtained. Mechanical properties are the most important criterion by which the completion of the sintering process can be ascertained. However, for the unsintered PTFE, another distinctive feature of the sintering process is the disappearance of the unique morphology and melting temperature. Sintered PTFE has a crystallinity of approximately 50 to 60% and a lower melting temperature of approximately 330° C. Thus, disappearance of the higher melting peak, as exhibited in differential scanning calorimetry (DSC) or other methods, is another criterion to confirm sintering of the PTFE particles.

As discussed above, supercritical carbon dioxide is a very good plasticizer of conventionally sintered PTFE. Using the LVDT system shown in FIG. 1, it was demonstrated that under the appropriate conditions of temperature and pressure, approximately 53% linear swelling can be observed. This corresponds to a composition of about 41% by weight of supercritical carbon dioxide. Unsintered PTFE has a crystallinity of greater than 90% and might be expected to have very little swelling in supercritical carbon dioxide. Using the same experimental set up shown in FIG. 1, unsintered PTFE samples were exposed to supercritical carbon dioxide at constant temperature as a function of pressure.

Figure 9:
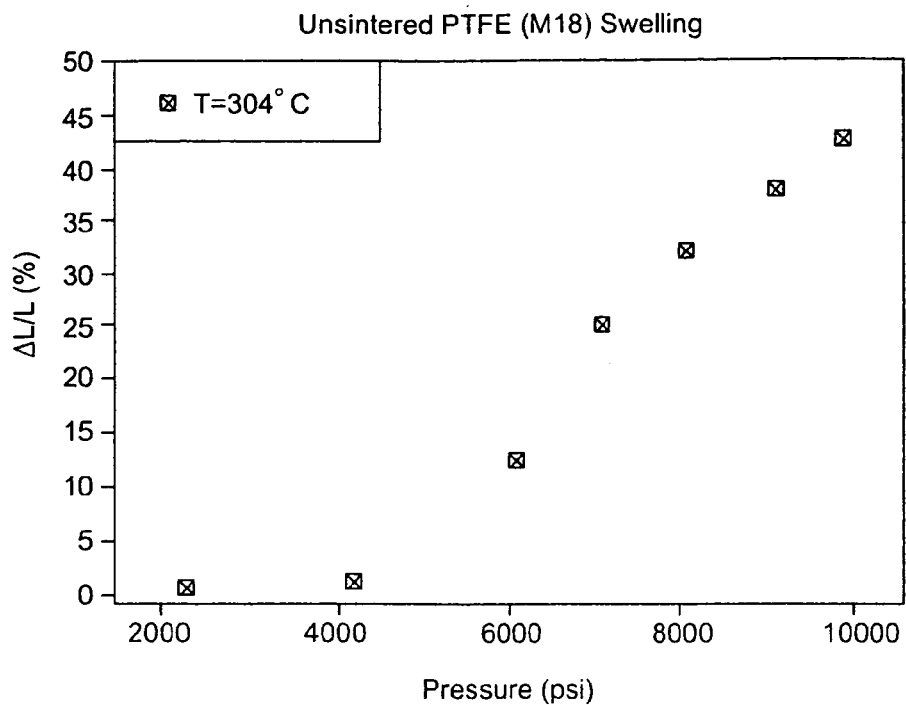
FIG. 9 is a graph showing the swelling of unsintered PTFE in supercritical carbon dioxide.

FIG. 9 clearly demonstrates the increase in swelling [$\Delta L/L(\%)$] with pressure for unsintered PTFE at 304° C. At pressures below about 4000 psi, there is negligible effects of supercritical carbon dioxide on unsintered PTFE, compared to the swelling observed in conventionally sintered PTFE at the corresponding temperature and pressure. However, FIG. 8 shows that the amount of swelling increases dramatically with increasing pressure (e.g., above 4,000 psi the unsintered PTFE begins to swell at a rapid rate and the swelling can increase to at least 40%).

Figure 10:
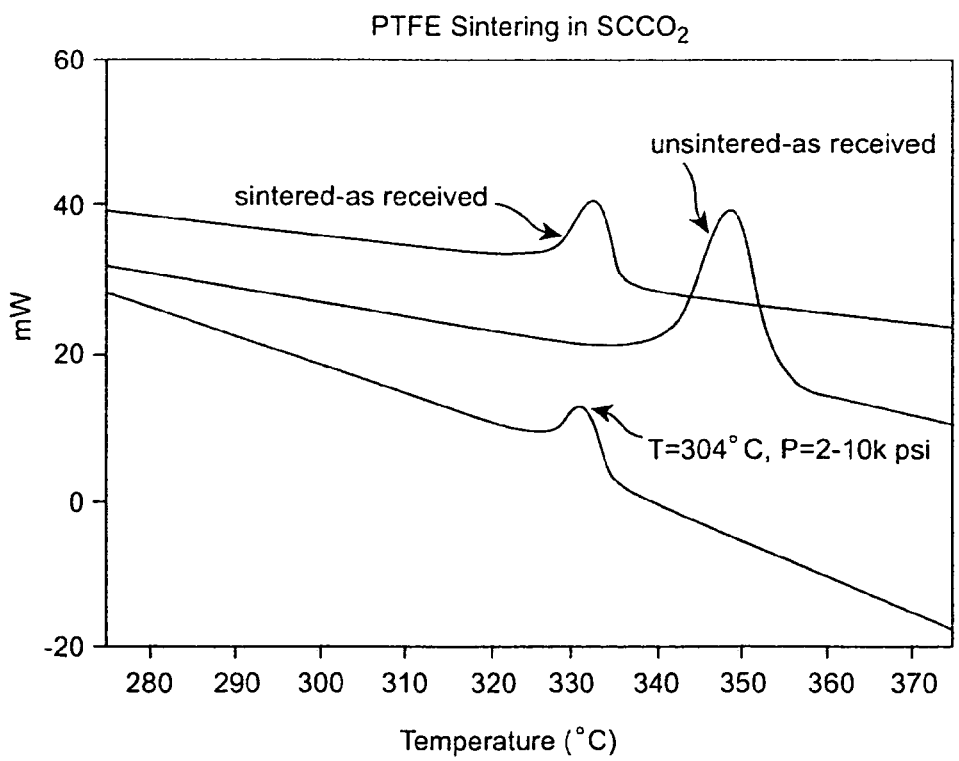
FIG. 10 is a graph present DSC curves of unsintered PTFE samples treated in supercritical carbon dioxide.

FIG. 10 shows the differential scanning calorimetry on the unsintered PTFE sample treated with supercritical carbon dioxide (i.e., unsintered PTFE incorporates supercritical carbon dioxide at elevated temperature and pressure to produce a swollen PTFE material). Note that there is little difference in the $T_m$ peaks (shape, size and position) of the supercritical carbon dioxide treated sample and an as received PTFE sample sintered conventionally. This is clear evidence that the as polymerized crystalline morphology is altered by treating it with supercritical carbon dioxide.

Figure 11:
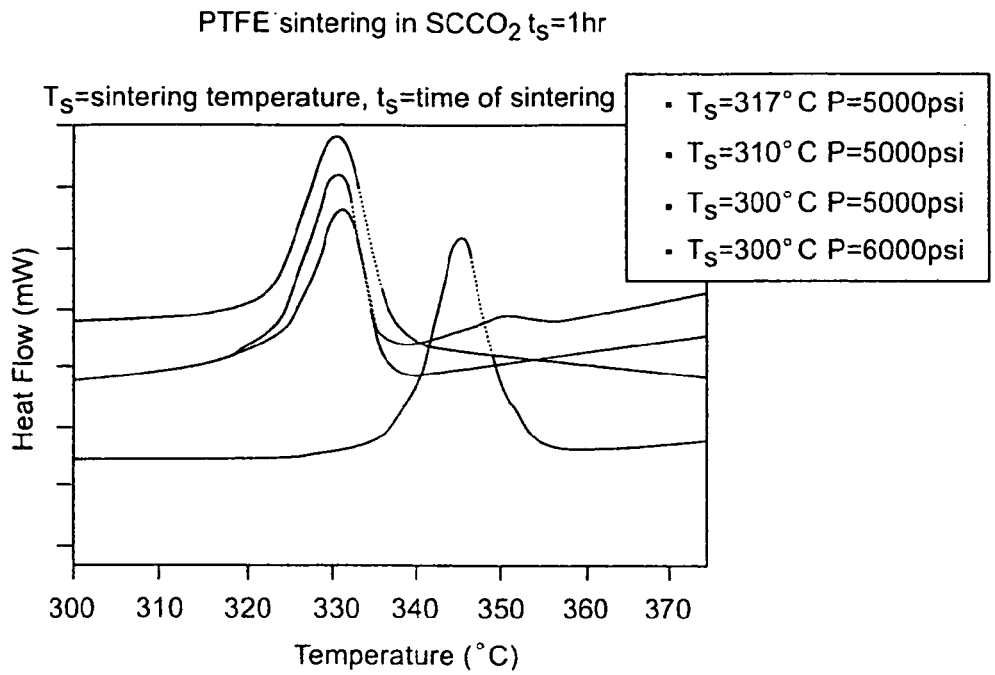
FIG. 11 is a graph showing the effect of pressure on the sintering temperature of PTFE in supercritical carbon dioxide.

FIG. 11 plots the DSC curves of the unsintered samples treated with supercritical carbon dioxide at different temperature and pressure conditions. The time of exposure to supercritical carbon dioxide was kept constant at $t_s$=1 hr. The graphs show that the effect of temperature and pressure on sintering is clearly demonstrated. Thus, lower sintering temperatures (e.g., approximately 300° C.) can be employed for higher pressure (P=8000 psi) while higher temperatures (approximately 317° C.) are needed at lower pressures (P=5000 psi) for complete sintering. This is significantly lower than the sintering temperature traditionally employed in the industry (approximately 380° C. for PTFE). Thus, a swollen flouropolymer material which contains tetrafluoroethylene monomers, such as PTFE, may be sintered at temperatures at least 10% lower than a non-swollen fluoropolymer material, and preferably at temperatures at least 15% lower than the non-swollen fluoropolymer material. In addition, the sintering time may be reduced, and the product purity may be increased when sintering is performed on a swollen fluoropolymer material.

Figure 12:
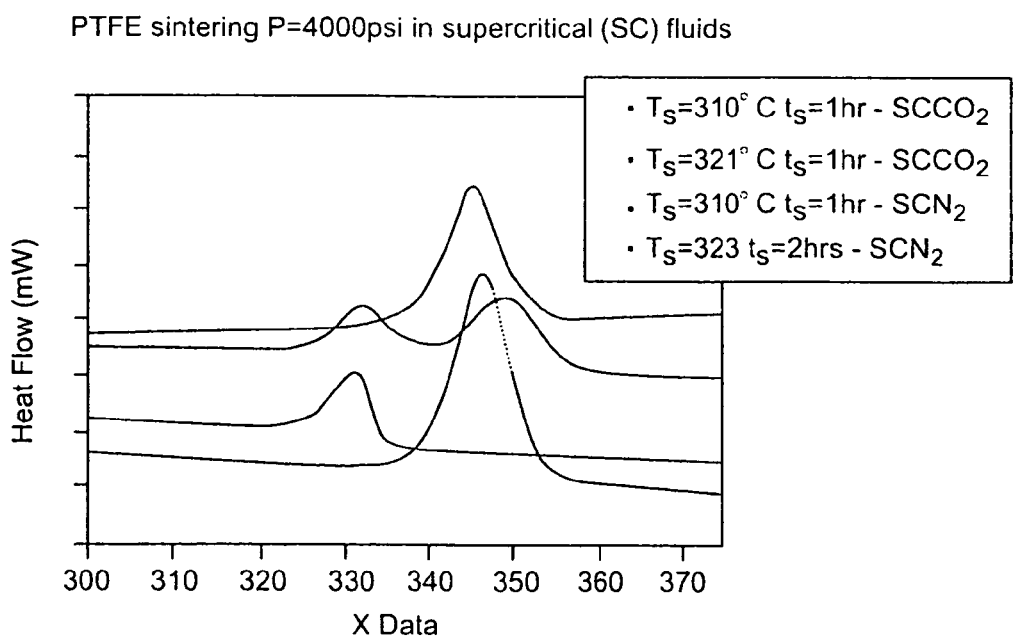
FIG. 12 is a graph showing the effect of different supercritical fluids on PTFE sintering.

FIG. 12 compares the DSC curves of the unsintered PTFE treated with supercritical carbon dioxide and supercritical nitrogen. It is clear that higher sintering temperatures (323° C.) and longer sintering times (2 hrs) is not enough for sintering PTFE in supercritical nitrogen. Thus, the supercritical fluid should be chosen to ensure supercritical fluids polymer interactions that ensure significant plasticization of the polymer. As noted above, co-solvents may be used to achieve this aim.

Under certain conditions, the enthalpy of melting was greatly increased by supercritical carbon dioxide processing. Increased melting enthalpy is associated with the increased volume fraction of crystals. Because the crystalline phase in semicrystalline polymers act as physical crosslinks, the effect of the supercritical carbon dioxide processing on mechanical properties was investigated. Table 1 summarizes a series of six different annealing protocols for PTFE samples (Daikin—18 PTFE) treated with supercritical carbon dioxide under different conditions. The mechanical and physical properties of the samples were evaluated, and the results of these evaluations are presented in Table 2.

TABLE 1

ANNEALING PROTOCOL FOR PTFE SAMPLE

| PROTOCOL NUMBER | ANNEAL TEMP 1 | TIME (HR) | PRESSURE (KSI) | ANNEAL TEMP 2 | TIME (HR) | VENT (MIN) |
|---|---|---|---|---|---|---|
| 1 | 300 | 4 | 10 | | | 45 |
| 2 | 310 | 4 | 10 | | | 45 |
| 3 | 320 | 2 | ATM | 290 | 3 | |
| 4 | 320 | 2 | 10 | 290 | 3 | 45 |
| 5 | 320 | 2 | 10 | 290 | 3 | 45 |
| 6 | 320 | 2 | 10 | 290 | 3 | 45 |

The samples in protocols 3 and 6 were also subject to a post anneal temperature and pressure treatment. Protocol 3 samples were maintained at 300° C. at atmospheric pressure for 1 hr, while samples in protocol 6 were maintained at 300° C. at 1.7 ks for 1 hr. In addition, protocol 6 samples were exposed to nitrogen on venting.

TABLE 2

MECHANICAL AND PHYSICAL PROPERTIES OF SAMPLES

| PROT. NUM. | SAMPS | MODULUS mean, ksi | % Change | STRAIN AT Break (%) | % Change | DSC $T_m$ | ENTHALPY J/g | % Change |
|---|---|---|---|---|---|---|---|---|
| As received | 7 | 47.3 | | 521 | | 326.8 | 35.2 | |
| 1 | 5 | 45.2 | −4.4 | 602.4 | 15.6 | 326.9 | 41.0 | 16.5 |
| 2 | 4 | 42.4 | −10.4 | 590.8 | 13.4 | 326.7 | 39.1 | 11.1 |
| 3 | 4 | 50.8 | 7.4 | 496.6 | −4.7 | 327.3 | 35.9 | 2.0 |
| 4 | 5 | 31.9 | −32.6 | 714.2 | 37.1 | 329.4 | 57.8 | 64.2 |
| 5 | 5 | 48.9 | 3.4 | 742.5 | 42.5 | 329.5 | 58.8 | 67.0 |
| 6 | 5 | 61.2 | 29.4 | 634.7 | 21.8 | 329.5 | 59.0 | 67.6 |

The column labeled "SAMPS" indicates the number of samples exposed at once to a given protocol. The strain at break for as received—15 PTFE was 521%, meaning that the sample could be stretched over five times its length before breaking. Strain to break was increased by up to 42% by Protocol 5 shown in the tables 1 and 2. The summary means that the sample was first heated to 320° C. for two hours at 10 ksi, then at 290° C. for three hours, followed by a slow vent over forty five minutes. Under these conditions, the tensile modulus was increased by a few percent. Protocol 6 resulted in a 29% increase in tensile modulus compared to the as-received material. Protocol 6 different from Protocol 5 in that the sample was subjected to nitrogen pressure (1.7 ksi) at 300° C. prior to cooling. The strain to break for protocol 6 was 21% higher than for the as-received material. Protocols 5 and 6 show similar enthalpies of melting. The nitrogen treatment may compress the sample and remove some volume fraction of porosity. In summary, the results presented in Tables 1 and 2 show that various protocols using supercritical carbon dioxide and post nitrogen treatment can greatly change the mechanical properties of PTFE.

Polychlorotrifluoroethylene, —(—$CF_2$—$CFCl$—)$_x$—, has been found to have profound changes in physical properties due to exposure to supercritical carbon dioxide, even with relatively low levels of plasticization. In particular, it was found that the melting point of PCTFE decreased to 150° C. at 8,000 psi supercritical carbon dioxide. At 4,000 psi supercritical carbon dioxide, the melting point of PCTFE decreased to 170° C., and at 2,000 psi supercritical carbon dioxide, the melting point decreased to 190° C. In sharp contrast, the melting point of PCTFE was around 205° C. under nitrogen ambient at a pressure of 8,000 psi. Hence, softening temperature decreased only with supercritical carbon dioxide, and the processing temperature may be decreased with supercritical carbon dioxide.

Figure 13:
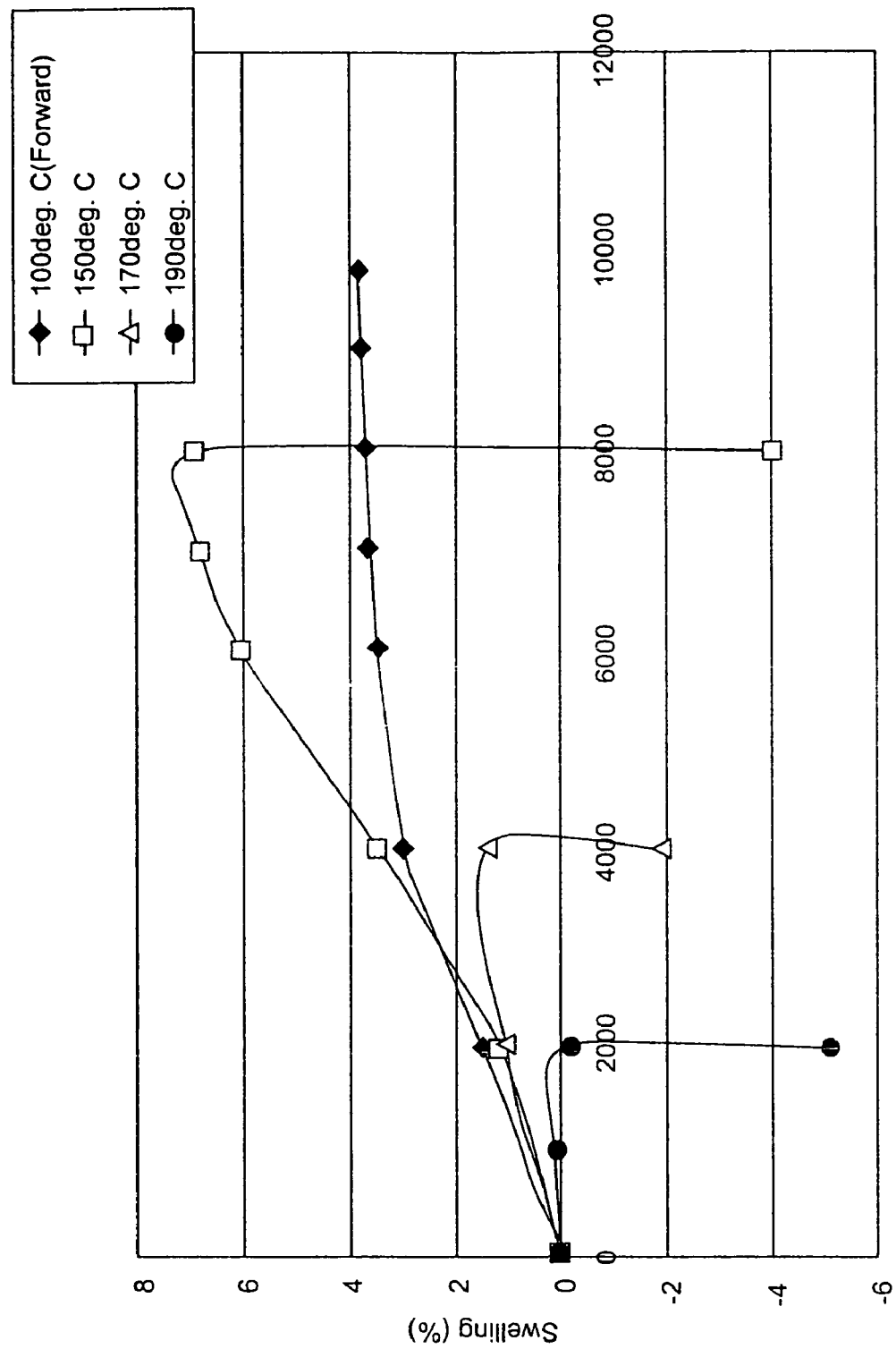
FIG. 13 is a graph of % swelling versus $CO_2$ pressure for PCTFE are different temperatures.

FIG. 13 shows that the melting point of PCTFE is lowered to 150° C. at 8 ksi even though linear swelling is only about 7%. This is a lowering of 60° C. compared to the normal melting point of PCTFE at ambient temperature (210–212° C.). At 2 ksi, the melting point is lowered to 190° C. As noted above, the lower of the melting point is specific to supercritical carbon dioxide. Nitrogen has little effect in lower the melting point, i.e., the melting point remains high (205° C. at 8 ksi nitrogen). These results have important implications in processing PCTFE. That is, processing under supercritical carbon dioxide will allow a larger window of safety in manufacturing articles from PCTFE. The normal processing temperature for PCTFE is 250° C., and the temperature of decomposition is 270° C. (very close to the processing temperature). By processing under supercritical carbon dioxide, the melting point can be dramatically lowered relative to the decomposition temperature.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method for processing polychlorotrifluoroethylene (PCTFE), comprising the steps of:
    exposing PCTFE to supercritical carbon dioxide at 8,000 psi;
    lowering the melting point of said PCTFE to 150° C.; and
    performing a manufacturing operation on said PCTFE above said melting temperature.

* * * * *